No. 616,968. Patented Jan. 3, 1899.
M. L. PRICE.
FLOWER POT.
(Application filed Mar. 23, 1896. Renewed June 2, 1898.)
(No Model.)
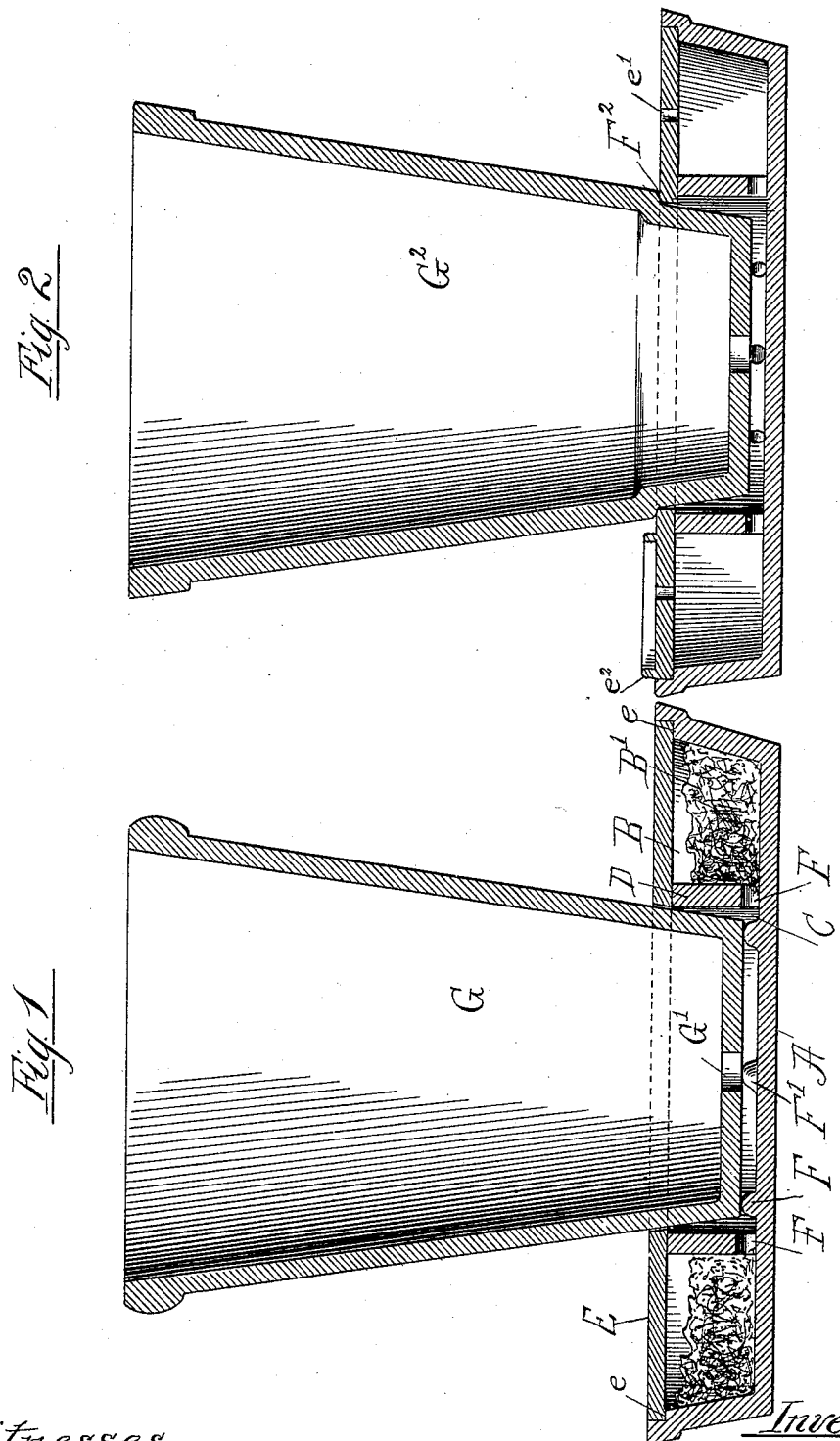
Witnesses
L. Clinton Hamlink
William L. Hall
Inventor
Marie L. Price
by Albert N. Graves
her Attorney

United States Patent Office.

MARIE L. PRICE, OF CHICAGO, ILLINOIS.

FLOWER-POT.

SPECIFICATION forming part of Letters Patent No. 616,968, dated January 3, 1899.

Application filed March 23, 1896. Renewed June 2, 1898. Serial No. 682,408. (No model.)

*To all whom it may concern:*

Be it known that I, MARIE L. PRICE, of Chicago, in the county of Cook and State of Illinois, have invented certain new and useful Improvements in Flower-Pots; and I do hereby declare that the following is a full, clear, and exact description thereof, reference being had to the accompanying drawings, and to the letters of reference marked thereon, which form a part of this specification.

My invention has for its object to supply fertilizant or other food, such as coloring-matter or chemicals for experimental purposes in liquid form or in suspension, to the subsoil of a flower-pot—that is, to feed it to the roots of the plant therein from beneath; and to this end it consists, primarily, in providing the holder or saucer with a compartment for the reception of a charge of solids separated from the pot by a drainage medium through which water poured into said compartment flows after seeping through the contents thereof and reaches the apertured bottom of the pot saturated more or less with the nutritious and fertilizing principles of said charge; secondly, in dividing the saucer by means of a permeable diaphragm or partition into two concentric compartments, the inner one receiving the base of the flower-pot and the outer one a charge of solids, through which the water or irrigation or solvent is seeped on its way to the central compartment and apertured base of the pot, and, thirdly, in various combinations and details of construction, hereinafter pointed out and claimed.

In the drawings, Figure 1 is an elevation in vertical central section through a flower-pot and holder embodying my invention, and Fig. 2 is a like elevation through a pot and holder embodying said invention in one of its alternative forms.

A represents a saucer or holder formed of earthenware, terra-cotta, or other befitting material and provided with a storage-compartment B (one or more) for the reception of a charge B' of fertilizant or any other material which it is desired to feed to the growing plant. This compartment or receptacle may be of any desirable shape and occupy any suitable or adequate space for its purpose, so that it is separated from the pot-receiving space or compartment C by a wall, partition, or diaphragm D so situated and of such character as to allow drainage therethrough and into the compartment C of water or other fluids seeping through the contents of said reservoir or storage-compartment. Most conveniently this diaphragm divides the saucer into two concentric chambers, as shown, the outer or a portion thereof serving as the receptacle for fertilizant or whatever material is to be fed and the inner receiving the base of the pot.

The diaphragm may be separable from the saucer, but is preferably integral, being formed of the same material, molded or fashioned and cooked or otherwise set in one piece therewith. It will be perforated or sufficiently permeable to allow the drainage of the storage-compartment to flow into the central compartment. For this purpose a series of ducts F, pierced through its base, will be sufficient.

To give a finished appearance, prevent the escape of objectionable odors, conceal the fertilizing material from view, and suppress, discourage, or retard germination and noxious or fungoid growth therein, the storage-compartment will or may be covered with a lid E, of appropriate shape, or, in the specific instance herein shown, of annular outline, resting at the outer edge upon the wall of the saucer or in a seat $e$ sunk therein and at the inner edge upon the top of the diaphragm. This lid or cover may have an opening or openings $e'$, leading to the storage-compartment for the introduction of air and water or other fluids, and these openings may be surrounded on the upper side by annular ribs or flanges $e^2$, so as to form shallow funnels to localize and direct the fluids through said openings.

G in Fig. 1 denotes an ordinary flower-pot having an aperture G' through the bottom and fitting into the central compartment of the saucer. To permit the free circulation of the drainage fluids beneath this pot and their ready access through the aperture G' to the subsoil therein, lugs or knobs F'' are formed on the floor of the compartment to support the pot a measurable distance thereabove.

In Fig. 2 the pot $G^2$ is reduced toward its base to afford an annular shoulder $F^2$, which sits upon the inner edge of the lid above the diaphragm, and thereby sustains the bottom above the saucer.

In practice the contents of the storage-compartment, whether fertilizant, coloring-matter, or chemicals, are kept drenched with water, which seeps through and drains past the diaphragm into the central compartment, arriving beneath the pot set therein more or less saturated with the essential elements of the storage charge and rising through the apertured bottom of said pot into contact with the soil therein, through which it is supplied by capillary attraction and in its enriched condition to the roots of the growing plant.

Believing myself to be the first to provide a flower-pot holder with a receptacle for the storage of solids arranged to drain into the compartment for the reception of the pot I do not limit my invention to the specific forms of embodiment herein described nor to the number of storage-compartments or to their relative arrangement, provided they are so arranged that each or all may drain toward the base of the pot or pots; but What I do claim, and desire to secure by Letters Patent, is—

1. The combination in a holder for flower-pots of a compartment for the reception of solids, a compartment for the reception of the pot, a perforate or permeable diaphragm separating the two compartments, and a lid covering the first compartment and its contents.

2. The combination in a holder for flower-pots, of a central compartment for the reception of the pot, a concentric compartment for the reception of solids, a perforate or permeable diaphragm separating the two compartments, and an annular lid covering the outer compartment.

3. The combination in a holder for flower-pots of a compartment for the reception of the pot, a compartment for the storage of solids, a perforate or permeable diaphragm between the two, and a lid covering the storage-compartment and having openings communicating therewith surrounded by circumjacent ribs.

4. The combination in a holder for flower-pots, of a compartment for the pot a receptacle for solids arranged to drain into said compartment, and means for supporting the pot above and out of contact with the floor of said compartment.

5. The combination with the pot of a saucer having a compartment for the reception of said pot provided with upstanding knobs on its floor, and a receptacle for solids draining into said compartment.

6. The combination with the pot having an annular shoulder near its base, of the saucer having concentric compartments separated by a perforate or permeable diaphragm, and the annular lid.

In testimony that I claim the foregoing as my invention I affix my signature, in presence of two witnesses, this 21st day of March, A. D. 1896.

MARIE L. PRICE.

Witnesses:
ALBERT H. GRAVES,
L. CLINTON HAMLINK.